United States Patent [19]
Meyer

[11] Patent Number: 4,747,540
[45] Date of Patent: May 31, 1988

[54] PRESSURE REGULATED ASSEMBLY FOR IRRIGATING AT WATER PRESSURES BELOW 10 PSI

[75] Inventor: Larry P. Meyer, Walla Walla, Wash.

[73] Assignee: Nelson Irrigation Corporation, Walla Walla, Wash.

[21] Appl. No.: 272,086

[22] Filed: Jun. 10, 1981

[51] Int. Cl.[4] .............................................. B05B 15/00
[52] U.S. Cl. ....................................... 239/76; 137/433; 239/726
[58] Field of Search .................. 239/76, 177, 178–184, 239/710, 711, 718–721, 570, 722–749; 137/433, 453, 505, 508, 593

[56] References Cited

U.S. PATENT DOCUMENTS

| | | | |
|---|---|---|---|
| 857,703 | 6/1907 | Willmann | 137/433 |
| 916,398 | 3/1909 | Edlund | 137/433 |
| 1,035,780 | 8/1912 | Fairchild | 137/433 |
| 1,044,327 | 11/1912 | Winter | 137/433 |
| 1,219,567 | 3/1917 | Leitch | 137/433 |
| 2,167,961 | 8/1939 | Sachs | 137/433 |
| 3,844,481 | 10/1974 | Livingston | 239/177 |
| 4,328,820 | 5/1982 | Serur | 137/433 |

FOREIGN PATENT DOCUMENTS

| | | | |
|---|---|---|---|
| 374330 | 4/1923 | Fed. Rep. of Germany | 239/719 |
| 47479 | 4/1977 | Japan | 239/76 |

*Primary Examiner*—Andres Kashnikow
*Assistant Examiner*—Michael J. Forman
*Attorney, Agent, or Firm*—Cushman, Darby and Cushman

[57] ABSTRACT

An assembly for irrigating at water pressure below 10 psi comprising a sprinkler head for discharging water at a desired discharge pressure below 10 psi onto a site to be irrigated, a pressure chamber for delivering a supply of water at a supply flow rate and at a supply pressure greater than the discharge flow rate and the discharge pressure, a container structure for containing a volume of water in communication with the sprinkler head having a free surface communicating with atmosphere disposed at a level above the sprinkler head a height generally corresponding to the desired discharge pressure, and a float valve mechanism for introducing water from the pressure chamber into the container structure sufficient to maintain the free surface of the volume of water contained therein generally at the aforesaid level.

8 Claims, 5 Drawing Sheets

PRESSURE REGULATED ASSEMBLY FOR IRRIGATING AT WATER PRESSURES BELOW 10 PSI

This invention relates to irrigation and more particularly to improvements in apparatus for irrigating at low pressure below ten pounds per square inch.

The need to increase the efficiency of applying water to the ground for purposes of agricultural irrigation has existed for a long time. The long term trend has been toward increased efficiency both in the effectiveness of the amount of water applied and the amount of energy required to apply the water. The need to decrease the amount of water required, together with the amount of energy required to effectively accomplish the irrigation process, has become more and more acute in the last several years. Whereas in past years it has been considered desirable to apply irrigation water to the ground by distributing it to the greatest possible pattern area from a given discharge emitter, it is now generally accepted that these practices are counter-productive, both from the standpoint of savings of water and savings of energy. Delivering water to the greatest possible pattern area from a given emitter requires projecting the water through the air at a high pressure energy level. In terms of water savings these time honored practices have always resulted in high water wastages, due to windage and evaporation. In terms of energy savings, it has been evident that substantially more energy is required to deliver a required gallonage per minute at a high pressure than at a low pressure. Indeed, the relationship is not a linear one as the costs of securing incremental increases in output pressure increases dramatically the higher the output pressure goes. Substantial energy savings can be achieved by systems which deliver the water required at low pressures. Application at low pressure requires more discharge emitters and more conduit to deliver the water to the emitters in order to apply the same amount of water to the same ground area. For example, in moving systems such as pivot move systems or lateral move systems, operating at lower pressures requires the replacement of impact sprinkler heads with booms having a plurality of spray heads thereon. In order to achieve added application efficiency it is preferable to position the spray heads closer to the ground to minimize wind loss, all of which greatly increases the problems presented by virtue of changes in pressure due to elevation changes as the system is moved. A change in elevation of 10 feet results in a change in static pressure of 4.33 psi. In a system in which the average emitter discharge pressure is 45 psi, a change in elevation of 10 feet thus results in a change in discharge pressure of only about 10%, an amount which may be considered acceptable. Where a given moving system must operate on terrain which varies more than 10 feet in elevation (which is quite common in many areas), then in order to keep the variation between the discharge pressures within the 10% limit it becomes necessary either to increase the average discharge pressure or to provide some means of controlling the variation in the discharge pressure through a given emitter due to change in elevation. Known devices for delivering such control include pressure regulator devices and flow control devices. All of these devices achieve the desired result of controlling variation with the desired 10% range because they have been heretofore utilized in systems operating at least in the 25 psi range and above. At 25 psi a 10% variation is 2.5 psi. A variation of 2.5 psi however, would clearly constitute an unacceptable variation in a system operating at 10 psi of 25% which percentage would increase even further as the operating psi decreases. It can therefore be seen that an essential requirement for operating an irrigation system at low discharging pressures significantly below 25 psi, such as 10 psi and below, particularly moving system, is the provision of emitters which can be controlled within pressure variations of 1 psi and below.

As indicated above, existing pressure regulator technology is such that results of this type cannot be reliably achieved. Moreover, existing flow control devices likewise do not provide the solution. Washer type flow control devices require a 10 psi pressure drop within the system to function properly. Even when such devices are utilized as the outlet orifice, see for example commonly assigned U.S. Pat. No. 4,091,996. a minimum discharge pressure of 10 psi is required in order for the flow control function to be operable. The specification of the above patent contains a detailed discussion of all the reasons for the need of accurate flow or pressure control in irrigation systems, all of which is particularly applicable to low pressure systems, and hence this disclosure is incorporated by reference into the present specification.

Accordingly it can be seen that a great need exists for an irrigation apparatus capable of operating efficiently at minimum discharge pressures, such as 10 psi and below, with a controlled pressure variation of approximately 10% or less, such as 1 psi and below, due to variation in supply pressures throughout a wide range due to elevation change, adjacent system start-up or shut-off, etc. It is an object of the present invention to satisfy that need.

In accordance with the principles of the present invention this objective is obtained by providing in combination with each emitter or group of emitters in the system a container for containing a volume of water in communication with such emitter or group of emitters, which volume of water has a free surface communicating with the atmosphere positioned at a level above the emitter discharge opening or openings a height which corresponds to the desired emitter discharge pressure and providing each such container with means for introducing therein supply water sufficient to maintain the free surface of the volume of water at the aforesaid level. In this way, the static head of water between the emitter discharge opening and free surface determines the outlet pressure with any change in operating elevation as a result of system movement being reflected only in a negligible change of the order encountered in the change in atmospheric pressure due to elevation change within the range encountered in an agricultural field. The limiting factor as to control thus becomes the effectiveness with which the free surface level can be controlled.

In accordance with the principles of the present invention, free surface level control can be obtained by any of the known methods whereby the liquid level is sensed and controlled by varying the liquid supply introduction thereto, a preferred arrangement being to sense the level by a float and to control supply water introduction as a simple direct function of the vertical position of the float. The simplicity and economy of the preferred arrangement amply meets the demands of a low pressure system for a large number of emitters, each one of which or each small group of which is accurately controlled as to its operating discharge pressure, notwithstanding substantial variation in the operating elevation or supply pressure thereof.

Another object of the present invention is the provision of an assembly of the type described which is simple in construction, effective in operation and economical to manufacture.

These and other objects of the present invention will become more apparent during the course of the following detailed description and appended claims.

Figure 1:
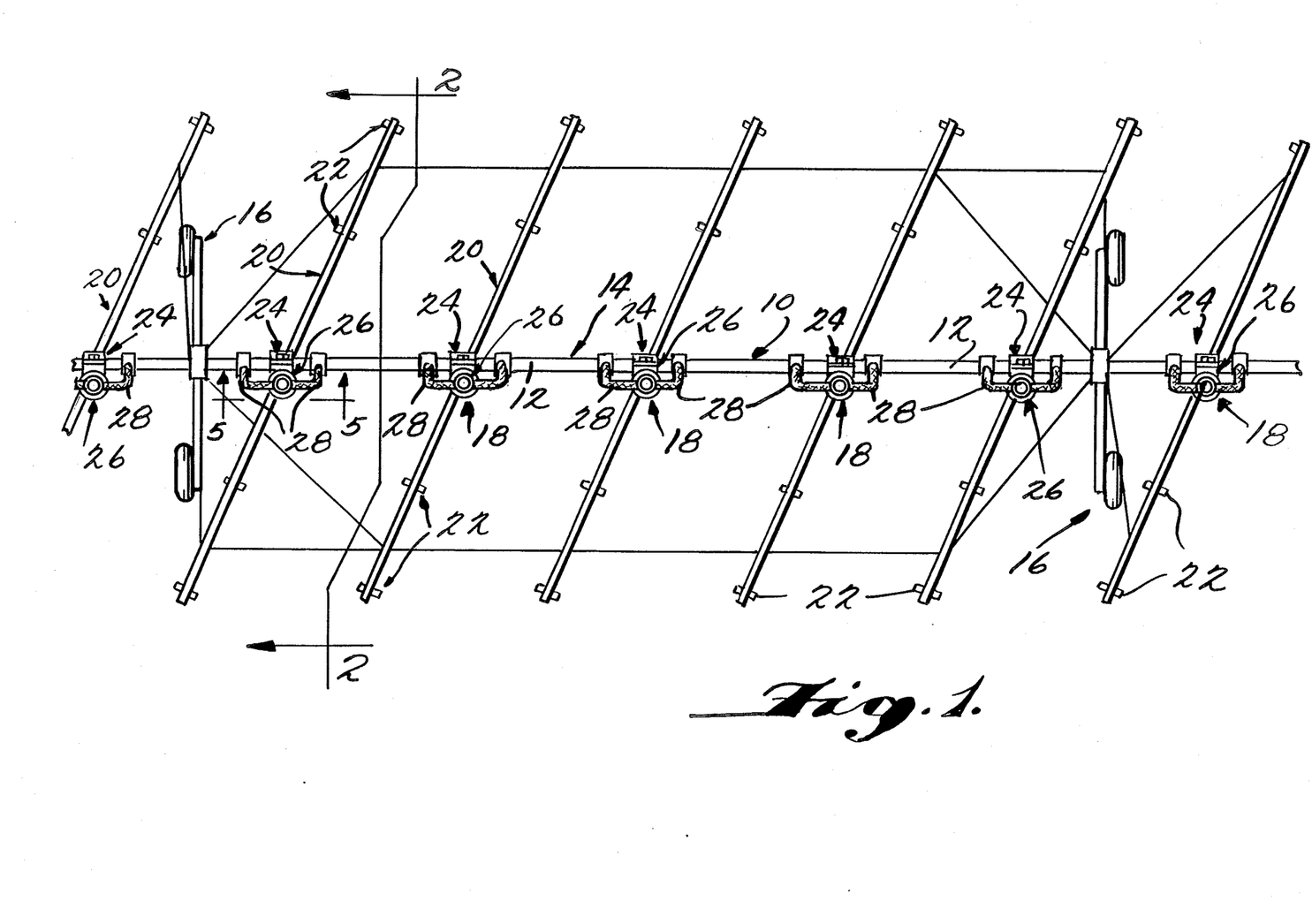
FIG. 1 is a top plan view of an outer portion of a conventional pivot move system improved to include a plurality of pressure regulated assemblies for irrigating at pressures below 10 psi embodying the principles of the present invention in lieu of the impact sprinkler heads conventionally utilized therewith.

Referring now more particularly to FIG. 1 of the drawings, there is illustrated therein a section of a conventional pivot move agricultural irrigation system, generally indicated at 10. The portion of the system 10 shown includes one outer section 12 of a conduit assembly, generally indicated at 14, of the system 10. The conduit section 12 extends between two longitudinally spaced wheeled tower assemblies, generally indicated at 16. For purposes of the present invention it is necessary merely to understand that the conduit assembly 14 consists essentially of a series of articulately interconnected conduit truss assemblies each of which includes a rigid conduit section 12 which is conventionally bowed upwardly with its axis disposed in a vertical plane and maintained in such upwardly bowed relation by a plurality of truss elements which, for the sake of clarity, are not shown in the drawings. The power driven wheeled assemblies 16 are schematically shown in plan in FIG. 1 and in side elevation in FIG. 2. The detailed construction and operation of the wheeled towers are entirely conventional. The somewhat schematic illustrations of the wheeled towers in the drawings are provided to show the essential environmental relationships required of the present invention. In this regard it will be noted that the operation of the system 10 is such that the wheeled towers 16 serve to move the conduit assembly 14 over the field surface in a direction transverse to the aforesaid vertical plane which is arcuately about a fixed center water supply pipe (not shown).

It will be understood that for purposes of the present invention the conduit assembly could just as well be a part of a conventional lateral move system, in which case the direction of movement of the system by virtue of the operation of the power driven wheeled towers is also transverse with respect to the aforesaid vertical plane, however, with a lateral move system the movement of the conduit assembly is generally translational within the field whereas with the pivot move system shown the movement is essentially a rotational movement.

It will be understood that the agricultural irrigation system 10 also includes fixed center pivot means (not shown) supplying the conduit assembly 14 and specifically each rigid conduit section 12 thereof with a supply of water under pressure during the aforesaid movement over the field. A conventional system also provides means (not shown) for effecting the guidance of the conduit assembly 14 during its movement. Moreover, a multiplicity of longitudinally spaced impact sprinkler heads (not shown) are conventionally mounted in water pressure communicating relation with the conduit assembly 14 so that the water under pressure supplied thereto will be distributed by the impact sprinkler heads onto the field surface therebelow during the operative movement of the conduit assembly.

Figure 2:
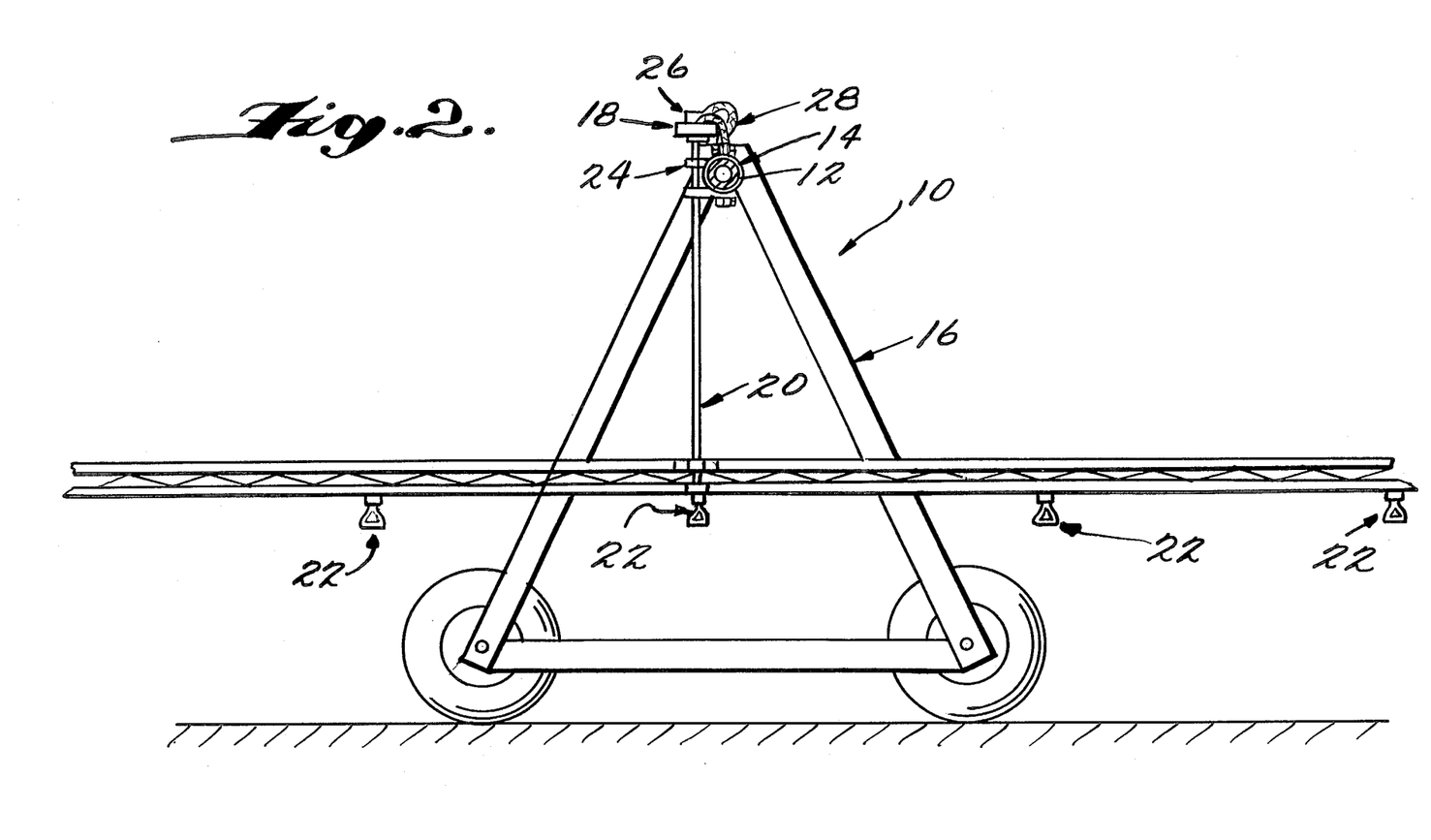
FIG. 2 is an enlarged fragmentary sectional view taken along the line 2—2 of FIG. 1.

The present invention is more particularly concerned with the construction and operation of a pressure regulated assembly for irrigating at water pressures of 10 psi and below, generally indicated at 18, which is utilized in the system 10 in lieu of the conventional impact sprinkler heads thereof. As best shown in FIG. 2, each assembly 18 consists essentially of an inverted T-shaped pipe assembly, generally indicated at 20, having a plurality of spray heads 22 mounted in horizontally spaced relation therealong, a clamping assembly 24 for adjustably fixedly connecting the pipe assembly 20 with the upwardly bowed conduit section 12 of the system 10, a float valve pressure regulating assembly 26 and a flexible hose assembly 28 for communicating the water under pressure within the conduit section 12 with the pipe assembly 20 in an accurately pressure regulated fashion so that during the movement of the system the water under pressure within the conduit will be distributed by the spray heads 22 onto the ground surface at a discharge pressure of below 10 psi.

Figure 3:
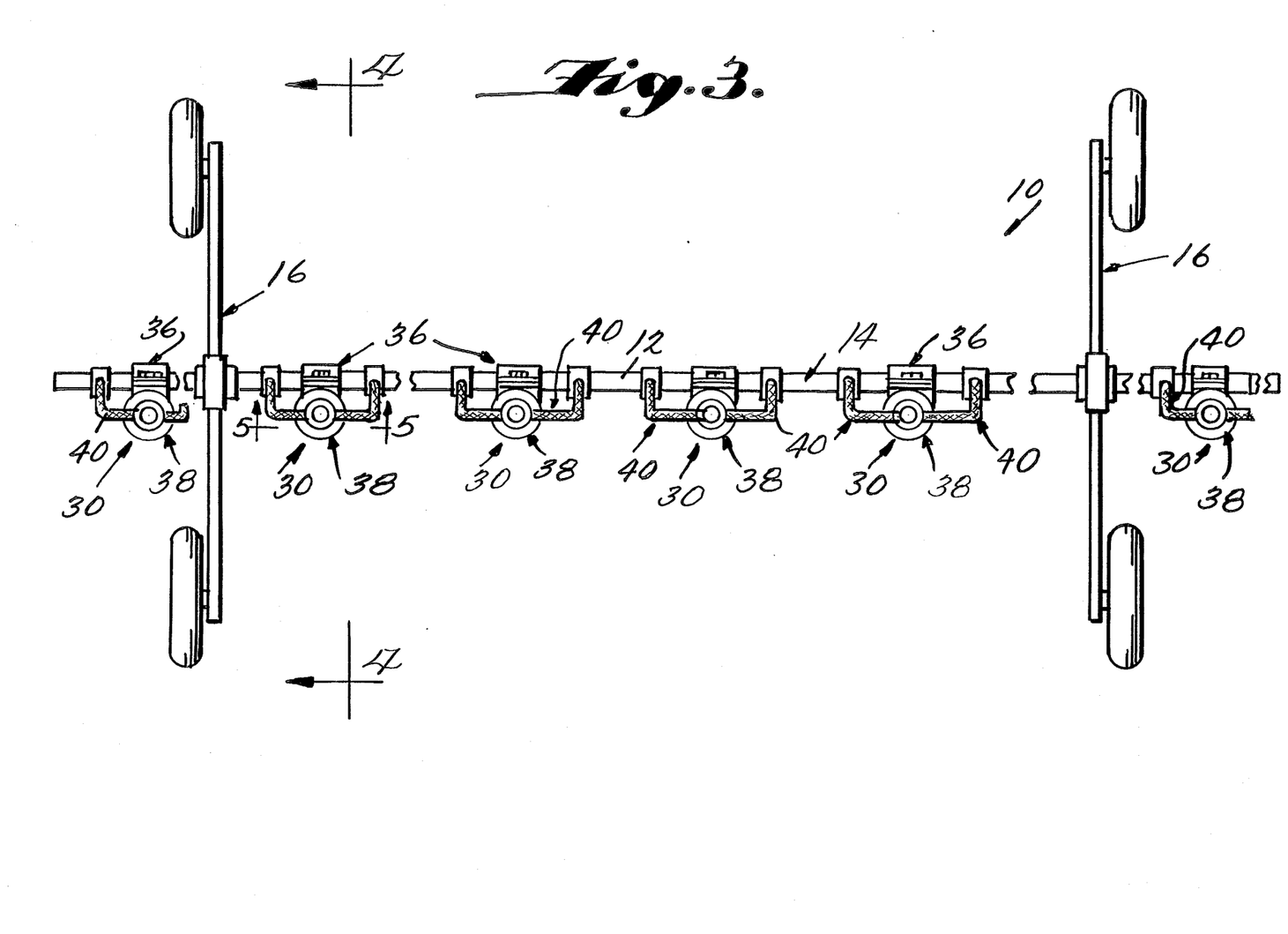
FIG. 3 is a view similar to FIG. 1 of an inner portion of the pivot move system improved to include another form of pressure regulated assemblies for irrigating at pressures below 10 psi embodying the principles of the present invention in lieu of the impact sprinkler heads conventionally utilized therewith.
Figure 4:
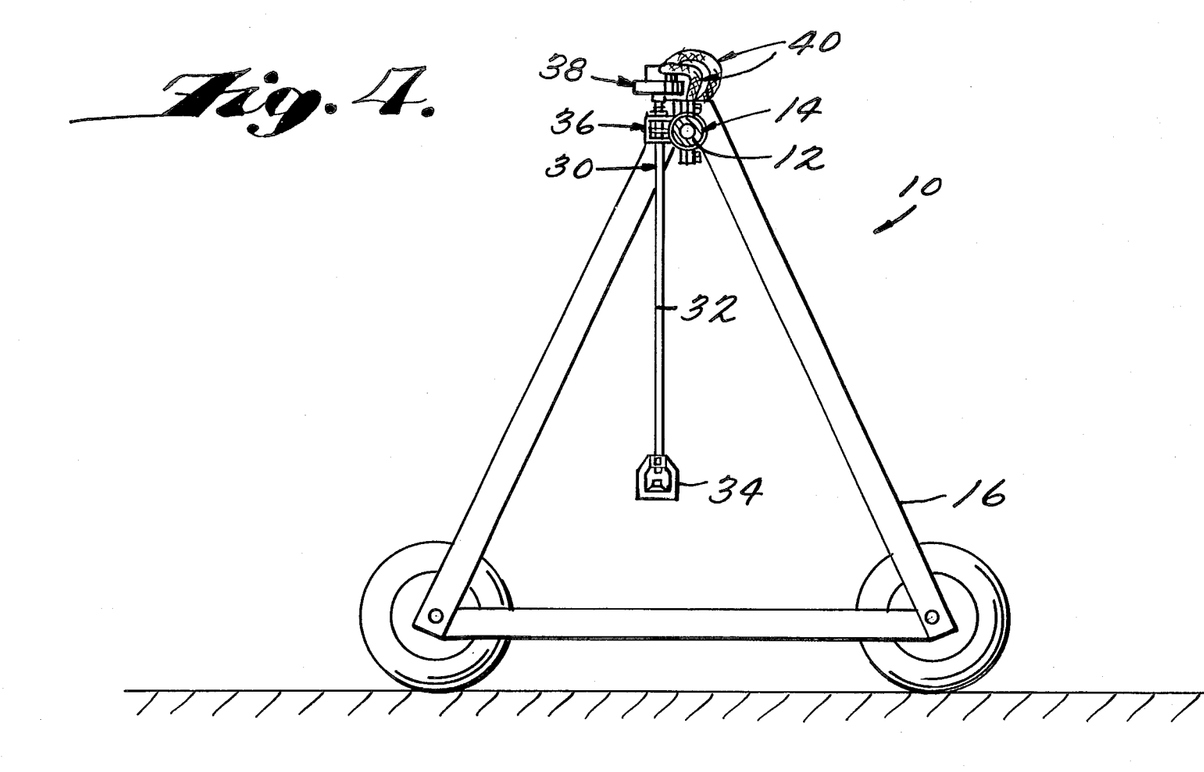
FIG. 4 is a fragmentary sectional view taken along the line 4—4 of FIG. 3.

In FIGS. 3 and 4 there is illustrated another inner section of the pivot move agricultural irrigation system 10 which includes another inner section 12 of the conduit assembly 14. Mounted on the inner conduit section 12 shown in FIGS. 3 and 4 in lieu of the conventional impact sprinkler heads thereof is another embodiment of a pressure regulated assembly for irrigating at water pressures of 10 psi and below, generally indicated at 30. As best shown in FIG. 4 each assembly 30 consists essentially of a vertical pipe section 32 having a single spray head 34 (similar to the spray head 22) mounted on the lower end thereof, a clamping assembly 36 for adjustably fixedly connecting the pipe section 20 with the upwardly bowed conduit section 12 of the system 10, a float valve pressure regulating assembly 38 (similar to the assembly 26) and a flexible hose assembly 40 (similar to the hose assembly 28) for communicating the water under pressure within the conduit section 12 with the pipe section 20 in an accurately pressure regulated fashion so that during the movement of the system 10 the water under pressure within the conduit section 12 will be distributed by each spray head 34 onto the ground surface at a discharge pressure of below 10 psi.

The specific exemplary assemblies 18 and 30 described above as being embodied in a single pivot move system are preferred. It will be understood that other sprinkler heads both of the movable instantaneous pattern type as well as the fixed instantaneous pattern type, may be utilized in lieu of the specific spray heads 22 and 34 illustrated in the drawings. Likewise, other pipe assemblies may be utilized between the spray heads or head and the pressure regulating assembly in addition to the preferred heads illustrated at 20 and 32. Moreover, the use of flexible hose assemblies, such as the assemblies 28 and 40, which are provided primarily because of the particular clamping assemblies 24 and 36 shown may be dispensed with when other clamping assemblies are utilized. The present invention is more particularly concerned with the combination of components embodied in the assembly (18 or 30) and the details of construction and operation of the float valve regulating assembly (26 or 38) thereof. Insofar as the details of construction of the other components are concerned reference is made to my copending commonly-assigned application, Ser. No. 257,621 filed Apr. 27, 1981, the disclosure of which is hereby incorporated by reference into the present specification. The detailed construction of the inverted T-shaped pipe assembly 20 of the spray heads 22 mounted thereon and of the clamping assembly 24 are described in the aforesaid application Ser. No. 257,621.

For present purposes it is important simply to note that the pipe assembly 20 or pipe section 32 merely serves to maintain the associated spray heads 22 or spray head 34 in a predetermined vertically spaced water communicating relation below the associated float valve pressure regulating assembly 26 or 38. The clamp assembly serves to mount the assembly in operative position on the conduit of the system preferably in an adjustable fashion and the flexible hose assemblies effect water communication while accommodating the adjustment.

The function of the float valve pressure regulating assembly is to contain a volume of water in communication with the associated pipe assembly and spray heads which volume of water has a free surface communicating with atmosphere disposed at a level above the spray heads or spray head a height generally corresponding to the desired discharge pressure and to introduce water under pressure from the conduit section 12 of the system 10 sufficient to maintain the free surface of the volume of water contained therein generally at the desired level. In this way a highly accurate discharge pressure of below 10 psi can be maintained at the sprinkler heads provided. The actual discharge pressure is a function of the height of the free surface of the volume of water maintained by the regulating assembly. A 10 foot height is equal approximately to 4.33 psi which may be regarded as a typical exemplary discharge pressure produced by the exemplary embodiments illustrated in the drawings.

Figure 5:
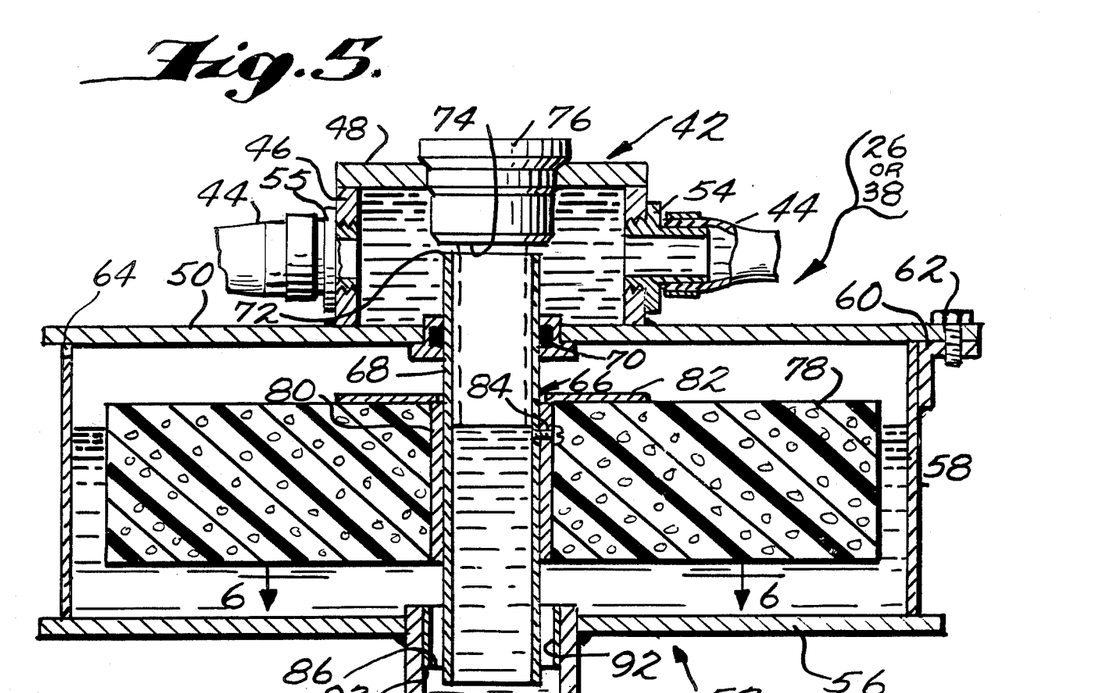
FIG. 5 is an enlarged fragmentary sectional view taken along the line 5—5 of either FIG. 1 or FIG. 3.
Figure 6:
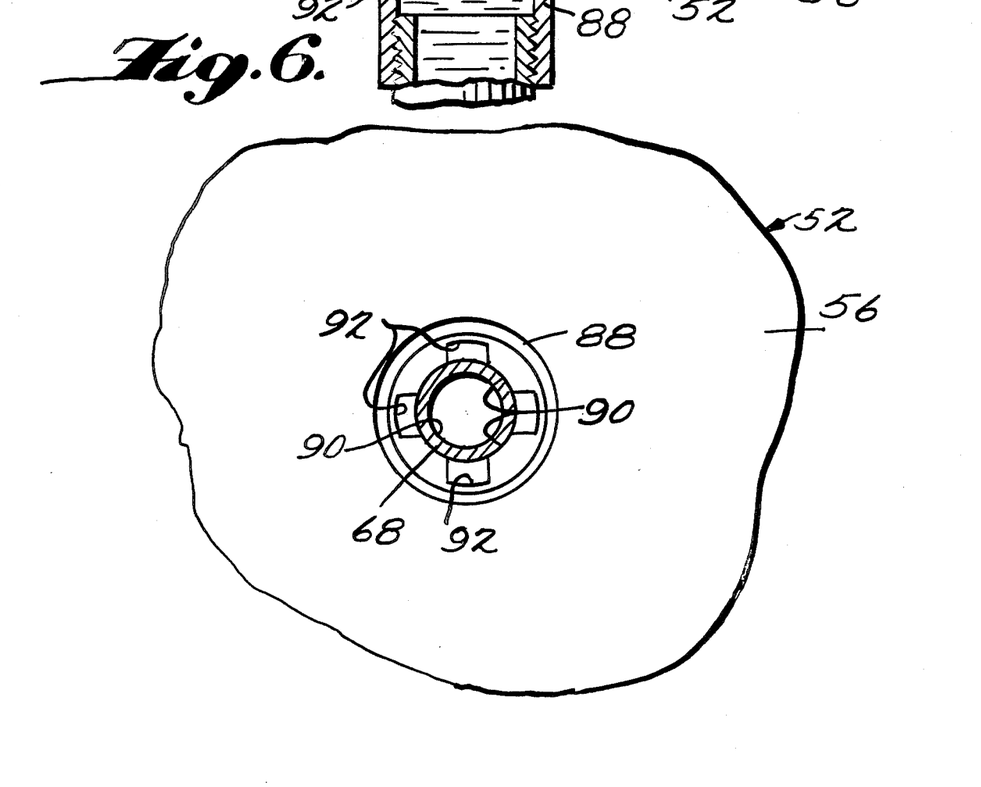
FIG. 6 is a fragmentary sectional view taken along the line 6—6 of FIG. 5.

Referring now more particularly to FIGS. 5 and 6 of the drawings, the preferred embodiment of the pressure regulating assembly 26 or 38 includes a pressure chamber, generally indicated at 42, which serves to receive a supply of water under pressure from the conduit section 20 through a pair of hose sections 44 which constitute the hose assembly 28 or 40. The pressure chamber is provided peripherally by a cylindrically shaped annular wall 46 disposed with its axis extending vertically and at its top by a circular top plate or wall 48. The bottom of the pressure chamber 42 is defined by a horizontally extending wall 50 of a size greater than the size of the cylindrical wall 46, which wall 50 also forms the upper part of a container structure 52 within which the volume of water having a free surface communicating with atmosphere is contained. Pressure chamber 42 is filled and maintained with supply water at a supply flow rate and at a supply pressure greater than the desired discharge flow rate and discharge pressure of the spray head of the assembly. The pressure connection to the pressure chamber 42 includes a pair of fittings 54 fixed in diametrically opposed positions within the peripheral wall and connected with the respective ends of the associated hose sections 44.

The container structure 52 includes a bottom wall 56 which extends parallel with the wall 50 in vertically spaced relation therebelow and a cylindrically shaped peripheral wall 58 extending upwardly from the periphery of the bottom wall 56 into engagement with the lower surface of the wall 50. The peripheral wall 58 is fixed to the wall 50 by any suitable means, such as annularly spaced brackets 60 welded to the upper exterior periphery of the wall 58 and bolts 62 extending through appropriate extensions on the wall 50 and into the brackets 60. Any suitable means may be provided for communicating the interior space of the container structure 42 with the atmosphere and, as shown, such means includes one or more notches 64 formed in the upper surface of the peripheral wall 58.

In accordance with the principles of the present invention the pressure regulating assembly 26 or 38 also includes means for introducing water delivered by the pressure chamber 42 into the container structure 52 in an amount and at a rate sufficient to maintain the free surface of the volume of water contained within the container structure 52 generally at a desired level. Since the volume of water within the container structure 52 is directly communicated with the spray head or spray heads mounted therebelow, the maintenance of the free surface at a predetermined level thereabove will determine the discharge pressure of the spray head or spray heads. By maintaining the level substantially constant a substantially constant discharge pressure is likewise maintained.

It will be understood that the means for introducing water under pressure from the pressure chamber into the container structure sufficient to maintain the aforesaid free surface level constant may be any suitable means. For example, the arrangement could embody water level sensors, a solenoid operated valve and suitable computerized solid state control equipment operable in response to the level sensors and other condition sensors to control the energization of the solenoid valve sufficient to maintain the free surface substantially constant. A preferred embodiment of the means, however, embodies a mechanical float valve mechanism, which is generally indicated by the reference numeral 66. The valve mechanism 66 includes a valve tube 68 which is disposed with its axis vertical and which extends through a central opening in the common wall 50 between the pressure chamber 42 and container structure 52. An annular sealing assembly 70 is provided in the central portion of the wall 50 in sealing engagement with the exterior periphery of the tube 68 so as to permit the same to move vertically with respect thereto while maintaining the differential pressure between the interior of the container structure 52.

Tube 68 includes an upwardly facing annular end surface 72 which has a valving function with respect to a downwardly facing flat valve seat surface 74 provided by an annular member 76 fixedly secured within the central portion of the top wall 48 of the pressure chamber 42. As shown in FIG. 5, the upper end portion of the tube 68 is disposed within the interior of the pressure chamber 42 and extends downwardly therefrom past the annular sealing assembly 70 into the interior of the container structure 52. An annular buoyant member 78 is suitably fixed to the exterior periphery of the central portion of the tube 68 so as to float within the volume of water contained within the container structure 52. It will be understood that the buoyant member may be of hollow construction, however, as shown it is formed by a body of closed cell foamed plastic material as, for example, foamed polystyrene. In order to provide a secure connection between the buoyant member 78 and the exterior periphery of the tube 68 there is provided a cylindrical core member 80 of a size to closely embrace the exterior periphery of the tube 68 and an upper disc 82 which is rigidly fixed to the upper end of the core member. As shown, the core member 80 is detachably fixed to the tube 68 as by a set screw 84.

The annular sealing assembly 70 serves to guide the upper end of the tube 68 for vertically reciprocating movement in response to the change in position of the buoyant member 78 by virtue of any change in the free surface of the liquid contained within the container structure 52. The lower end portion of the tube 68 is guided by an annular guide member 86 mounted within the upper end of an outlet tube 88 suitably fixed to the central portion of the bottom wall 56 of the container structure 52. As best shown in FIG. 6, the annular guide member 86 is formed with a plurality of annularly spaced tube engaging surfaces 90 which are of a shape to be disposed within a cylinder corresponding generally with the exterior periphery of the tube and a plurality of annularly spaced slots or openings 92 which serve to communicate the interior of the container structure 52 with the lower end of the discharge tube 88 and the lower end of the valve tube 68. As shown, the lower end of discharge tube 88 is interiorly threaded to threadedly connect with the upper end of the vertical mounting pipe section of pipe assembly 20 or the pipe section 32.

It will be understood that the system 10, whether of the pivot move type shown or of the lateral move type, in operation is supplied with a supply of water under pressure by a suitable pump (not shown). The pump is sized to feed water under pressure to the conduit assembly 14 so that it will be available therein at a supply rate and at a supply pressure greater than the discharge rate and discharge pressure of the sprinkler heads 22 and 34 of the system. Each irrigation assembly 18 and 30 includes a hose assembly 28 or 40 which communicates the supply water under pressure within the corresponding conduit section 12 of the conduit assembly 14 to the pressure chamber 42 of the associated pressure regulating assembly 26 or 38. As shown, each hose assembly includes two hose sections 44 which serve to communicate the supply water to the interior of the associated pressure chamber 42. Valve tube 68 extends upwardly through the annular sealing assembly 70 into the pressure chamber. The spacing of upwardly facing annular valve surface 72 with the downwardly facing seat surface 74 determines the amount of water which can leave the pressure chamber. This spacing is determined by the position of the buoyant member 78 which, in turn, is determined by the amount of water contained within the container structure 52. Thus, at start-up, when the entire assembly 26 or 38 is free of contained water, the buoyant member 78 would be disposed in its lowermost position within the container structure 52 so that valve surface 72 is disposed a maximum distance from valve seat 74. As supply water is introduced into the pressure chamber by hose sections 44 the water will pass from between the valve surface 72 and valve seat 74 downwardly through valve tube 68 and hence into the pipe assembly 20 or 32 supported therebelow and finally outwardly therefrom through either the series of spray heads 22 or the single spray head 34. The spray heads provide a restriction to flow causing the water to back up into respective pipe section and from the pipe section through discharge tube 88 and to the interior of the container structure 52. As the water rises in the interior of the container structure 52, the buoyant member 78 is moved upwardly. As the buoyant member 78 moves upwardly the spacing between the upwardly facing valve surface 72 and the downwardly facing valve seat 74 reduces. Buoyant member 78 will continue to rise and the aforesaid valve spacing continue to reduce until the reduction in the latter causes a sufficient restriction in the flow of water from the pressure chamber into the valve tube to reach a position of equilibrium with respect to the discharge of the water through the spray heads. At this position an amount of water is introduced into the volume of water contained within the container 52 which is equal to the amount of water flowing out of the sprinkler heads or head communicating therewith and hence the level of the free surface of the volume of water which is communicated with the atmosphere within the container structure 52 by virtue of vent openings 64 will be maintained substantially at a constant level. The discharge pressure of the spray heads 22 or spray head 34 is equal to the head of water contained thereabove. One foot of water is equal to approximately 0.433 pounds per square inch and hence, a ten foot height (as exemplarily shown) from the discharge opening of the spray heads 22 or spray head 34 to the free surface of the volume of water contained within the associated container structure 52 would be equal to a discharge pressure of 4.33 psi.

The arrangement is such that the discharge pressure remains the same irrespective of the elevation within the field at which the particular spray head is operating. That is, so long as the height of the free surface above the outlet of the spray head remains the same, the only difference which occurs as a result of a change in field elevation is the difference in the atmospheric pressure by virtue of the difference in field height. Thus, a difference of 100 feet in the elevation within a field would constitute an insignificant difference in the atmospheric pressure, whereas 100 feet difference in a static head of liquid would cause a difference of 43.3 psi in discharge pressure. Similarly, the tilting of the system during operation due to changes in the field terrain may cause the free surface to assume an angular position within the container structure 52, however this difference is likewise insignificant in relation to the tilt angles which can be expected. In any event normal expected field inclinations would not cause a variation of 10%, an acceptable accuracy level. In this regard note that in the exemplary embodiment wherein the discharge pressure is 4.33 psi, a 10% variation is still only a 0.433 psi variation, or considerably below the 1 to 2 or more psi variation normally encountered in typical commercial pressure regulators.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. An assembly for irrigating at water pressures below 10 psi comprising means for discharging water at a desired discharge pressure below 10 psi onto a site to be irrigated horizontally elongated conduit means having outlet means for delivering water at a supply flow rate and at a supply pressure greater than said discharge flow rate and said discharge pressure, means for containing a volume of water in communication with said water discharging means having a free surface communicating with atmosphere disposed at a level above said water discharging means a height generally corresponding to said desired discharge pressure, and means for introducing water from the outlet means of said conduit means into said containing means sufficient to maintain the free surface of the volume of water contained therein generally at said level, said horizontally elongated conduit means having inlet means therein spaced horizontally a substantial horizontal distance from said outlet means for communicating with a generally constant source of water having a pressure and flow rate sufficiently greater than the supply pressure and flow rate as to insure that the interior of said horizotnally elongated conduit is at all times filled with water so that water will be available at all times at said supply pressure and supply flow rate.

2. In a moving agricultural irrigation system of the type including a plurality of wheeled towers and elongated water conduit means extending longitudinally therebetween in support relation thereto for containing water under pressure movable by said wheeled towers over a field to be irrigated, said elongated water conduit means having inlet means for communicating with a generally constant source of water at a pressure and flow rate sufficient to maintain said conduit means filled with water, and a plurality of water distributing assemblies carried by said conduit means in longitudinal space relation therealong for distributing water under pressure from said conduit means onto the adjacent portions of the field over which the conduit means is moved by said wheeled towers, the improvement which comprises each of said water distributing assemblies being operable to irrigate at water pressure below 10 psi and comprising means for discharging water at a desired discharge pressure below 10 psi onto the field to be irrigated, means connected in watertight commmunicating relation with said conduit means and having outlet means for delivering water within said conduit means at a supply flow rate and at a supply pressure greater than said discharge flow rate and said discharge pressure, means for containing a volume of water in communication with said water discharging means having a free surface communicating with atmosphere disposed at a level above said water discharging means a height generally corresponding to said desired discharge pressure, and, means for introducing water from the outlet means of said supply delivering means into said containing means sufficient to maintain the free surface of the volume of water contained therein generally at said level.

3. An assembly as defined in claim 1 or 2 wherein said water introducing means comprises buoyant means disposed in floating relation within the volume of water contained within said containing means for vertical movement in response to the vertical movement of the free surface of said volume of water and valve means operatively connected with said buoyant means for controlling the amount of water introduced into said containing means in accordance with the vertical position of movement of said buoyant means.

4. An assembly as defined in claim 3 wherein said water containing means includes a vertically extending pipe section, and a container structure within which said free water surface is communicated with atmosphere, said container structure being disposed in water communicating relation to the upper end of said pipe section.

5. An assembly as defined in claim 4 wherein said supply delivering means comprises a water pressure chamber disposed above said container structure and said valve means includes an open ended vertical tube extending upwardly into said pressure chamber, annular sealing means within the lower portion of said pressure chamber for slidably sealingly engaging the exterior periphery of said tube so as to enable the open upper end of said tube to be moved vertically within said pressure chamber, and stationary valve seat means within said pressure chamber above said annular sealing means, said valve seat means facing downwardly for valved cooperation with the open upper end of said tube.

6. An assembly as defined in claim 5 wherein said tube extends downwardly from said annularly sealing means into said container structure and has its open lower end disposed in communicating relation with the interior of said pipe section.

7. An assembly as defined in claim 6 wherein said container structure includes a bottom wall having an annular structure mounted in the central portion thereof for connecting said container structure with said pipe section, said annular structure having annularly spaced portions guidingly engaging the exterior periphery of said tube.

8. An assembly as defined in claim 6 wherein said buoyant means comprises a lighter-than-water body fixed in surrounding relation to the exterior periphery of said tube in a position between said annular sealing means and the open lower end of said tube.

* * * * *